US012573621B2

(12) United States Patent
Li et al.

(10) Patent No.: US 12,573,621 B2
(45) Date of Patent: Mar. 10, 2026

(54) ELECTROCHEMICAL APPARATUS AND ELECTRONIC APPARATUS

(71) Applicant: Ningde Amperex Technology Limited, Ningde (CN)

(72) Inventors: Chunhua Li, Dongguan (CN); Huixin Wang, Dongguan (CN)

(73) Assignee: Ningde Amperex Technology Limited, Ningde (CN)

( * ) Notice: Subject to any disclaimer, the term of this patent is extended or adjusted under 35 U.S.C. 154(b) by 568 days.

(21) Appl. No.: 18/145,373

(22) Filed: Dec. 22, 2022

(65) Prior Publication Data

US 2023/0197946 A1      Jun. 22, 2023

(30) Foreign Application Priority Data

Dec. 22, 2021    (CN) ......................... 202111581347.6

(51) Int. Cl.
| | |
|---|---|
| *H01M 4/505* | (2010.01) |
| *H01M 4/02* | (2006.01) |
| *H01M 4/04* | (2006.01) |
| *H01M 4/62* | (2006.01) |
| *H01M 10/0525* | (2010.01) |

(52) U.S. Cl.
CPC ......... *H01M 4/505* (2013.01); *H01M 4/0404* (2013.01); *H01M 4/623* (2013.01); *H01M 4/625* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 11,502,300 | B1 * | 11/2022 | Qian ..................... | H01M 4/485 |
| 11,967,711 | B2 * | 4/2024 | Roberts .................. | C01G 53/50 |
| 2011/0217574 | A1 * | 9/2011 | Toyama .............. | H01M 10/052 |
| | | | | 429/61 |
| 2014/0231720 | A1 * | 8/2014 | Oh ........................ | H01M 4/623 |
| | | | | 252/182.1 |

| | | | | |
|---|---|---|---|---|
| 2021/0028452 | A1 * | 1/2021 | Su .......................... | H01M 4/521 |
| 2021/0408536 | A1 * | 12/2021 | He ........................... | H01M 4/62 |
| 2022/0029160 | A1 * | 1/2022 | Thackeray ............ | H01M 4/505 |
| 2023/0387461 | A1 * | 11/2023 | Sun ................... | H01M 10/0567 |
| 2024/0297338 | A1 * | 9/2024 | Dong .................... | H01M 4/133 |

FOREIGN PATENT DOCUMENTS

| | | |
|---|---|---|
| CN | 101197436 A | 6/2008 |
| CN | 102983355 A | 3/2013 |
| CN | 104051720 A | 9/2014 |
| CN | 104241680 A | 12/2014 |
| CN | 106531984 A | 3/2017 |
| CN | 109546204 A | 3/2019 |
| CN | 113410426 A | 9/2021 |

OTHER PUBLICATIONS

Extended Search Report issued on Aug. 7, 2023, in corresponding European Application No. 22215557.4, 5 pages.
Office Action issued on Dec. 25, 2023, in corresponding Chinese Application No. 202111581347.6, 16 pages.
Office Action issued on Jun. 28, 2024, in corresponding Chinese Application No. 202111581347.6, 10 pages.
Decision of Refusal issued on Aug. 9, 2024, in corresponding Chinese Application No. 202111581347.6, 12 pages.
Liu, "Synthesis and Characterizations of LiMn2O4LiFePO4 and Li[Ni1/3Co1/3Mn1/3]O2/LiFePO4 Blend Cathodes for Li-Ion Batteries", Database of Chinese Doctoral Dissertations, Library Engineering Technology II, China Academic Journal Electronic Publishing House, Jun. 2013, 127 pages; with partial English translation.
Gao et al., "Effect of Mixed LiFePO4—LiMn2O4 Cathode Material on the Performance of Batteries", Power Technology, China Academic Journal Electronic Publishing House, Nov. 2007, vol. 31, Issue 11, pp. 881-884, with partial English translation.

* cited by examiner

*Primary Examiner* — Kevin M Bernatz
(74) *Attorney, Agent, or Firm* — Maier & Maier, PLLC

(57) ABSTRACT

An electrochemical apparatus includes a positive electrode plate, the positive electrode plate includes a positive electrode active material layer, the positive electrode active material layer includes a positive electrode active material, the positive electrode active material includes a manganese-containing material, and a mass ratio Y of the manganese-containing material to the positive electrode active material ranges from 0.4 to 1. Through control of the mass ratio Y of the manganese-containing material to the positive electrode active material in the positive electrode active material layer, Mn dissolution out of the positive electrode active material layer can be effectively controlled.

15 Claims, No Drawings

ELECTROCHEMICAL APPARATUS AND ELECTRONIC APPARATUS

CROSS-REFERENCE TO RELATED APPLICATIONS

This application claims priority to Chinese Patent Application No. 202111581347.6, filed on Dec. 22, 2021, the whole disclosure of which is incorporated herein by reference.

TECHNICAL FIELD

This application relates to the field of electrochemical energy storage, and specifically, to an electrochemical apparatus and an electronic apparatus.

BACKGROUND

With the development of electrochemical energy storage technologies, electrochemical apparatuses (for example, lithium-ion batteries) have attracted much attention due to their high energy density and long battery life, and manganese-containing materials (for example, lithium manganate) can significantly improve the safety performance of electrochemical apparatuses, and reduce material costs. However, during high temperature storage, due to the Jahn-Teller (Jahn-Teller) effect and HF corrosion in the electrolyte, Mn is dissolved out, causing capacity fading and cost increase of electrochemical apparatuses, and weakening product competitiveness. Therefore, suppression of Mn dissolution is an important issue for performance optimization of electrochemical apparatuses including manganese-containing materials.

SUMMARY

This application provides an electrochemical apparatus. The electrochemical apparatus includes a positive electrode plate, the positive electrode plate includes a positive electrode active material layer, the positive electrode active material layer includes a positive electrode active material, the positive electrode active material includes a manganese-containing material, and a mass ratio Y of the manganese-containing material to the positive electrode active material ranges from 0.4 to 1.

In some embodiments, the manganese-containing material contains lithium manganate. In some embodiments, the lithium manganate contains cubic-crystal-system lithium manganate. In some embodiments, a surface density of the positive electrode active material layer is X g/cm², where $18 \leq X \leq 52$. In some embodiments, an Mn dissolution concentration in the positive electrode plate is Z ppm, where $Z = (-52.99X + 3215.5) \times 10Y/9$, and $160 \leq Z \leq 2500$. In some embodiments, a mass ratio of the manganese-containing material to the positive electrode active material layer ranges from 0.38 to 0.95. In some embodiments, the positive electrode plate further includes a positive electrode current collector, and the positive electrode active material layer is disposed on one surface or two surfaces of the positive electrode current collector. In some embodiments, the positive electrode active material layer further includes a conductive agent and a binder. In some embodiments, the conductive agent includes at least one selected from the group consisting of conductive carbon black, Ketjen black, laminated graphite, graphene, carbon nanotube, and carbon fiber, the binder includes at least one selected from the group consisting of carboxymethyl cellulose, polyvinylidene fluoride, polyacrylic acid, polyvinylpyrrolidone, polyaniline, polyimide, polyamideimide, polysiloxane, styrene-butadiene rubber, epoxy resin, polyester resin, polyurethane resin, and polyfluorene, and a mass ratio of the positive electrode active material, the conductive agent, and the binder in the positive electrode active material layer is (80-99):(0.1-10):(0.1-10).

An embodiment of this application further provides an electronic apparatus, including the foregoing electrochemical apparatus.

According to this application, through control of the mass ratio Y of the manganese-containing material to the positive electrode active material, the Mn dissolution out of the positive electrode active material layer can be effectively controlled.

DETAILED DESCRIPTION

The following embodiments may allow persons skilled in the art to understand this application more comprehensively, but impose no limitation on this application in any manner.

Some embodiments of this application provide an electrochemical apparatus. The electrochemical apparatus includes a positive electrode plate. In some embodiments, the positive electrode plate includes a positive electrode active material layer. In some embodiments, the positive electrode active material layer includes a positive electrode active material. In some embodiments, the positive electrode active material includes a manganese-containing material, where a mass ratio Y of the manganese-containing material to the positive electrode active material ranges from 0.4 to 1. Controlling the mass ratio Y of the manganese-containing material to the positive electrode active material within 0.4 to 1 can control Mn dissolution out of the positive electrode active material layer to be at a relatively low level, thereby reducing storage capacity loss of the electrochemical apparatus. In addition, when the mass ratio Y of the manganese-containing material to the positive electrode active material is less than 0.4, the capacity loss caused by the Mn dissolution out of the positive electrode active material does not dominate, and the Mn dissolution does not conform to the following relational expression, which is not conducive to the control of Mn dissolution.

In some embodiments, the manganese-containing material contains lithium manganate. Lithium manganate has low costs and good stability, and hence is beneficial to improving the safety performance of the electrochemical apparatus. In some embodiments, the lithium manganate contains cubic-crystal-system lithium manganate. In some embodiments, the cubic-crystal-system lithium manganate has an insignificant polarization effect, and hence can alleviate capacity fading of the electrochemical apparatus. In some embodiments, during high temperature storage, the J-T effect is easy to occur in a lithium manganate material. The J-T effect refers to a capacity fading phenomenon caused by electrode polarization effect intensified due to the fact that when the average valence state of Mn is lower than +3.5, the crystal structure is distorted and changes from the cubic crystal system to the tetragonal crystal system, resulting in lattice distortion.

In some embodiments, a surface density of the positive electrode active material layer is X g/cm², where $18 \leq X \leq 52$. The surface density of the positive electrode active material layer refers to a weight of the positive electrode active material layer in unit area. At this high surface density, the migration capability of the electrolyte in the thickness direction of the positive electrode plate (perpendicular to a surface of the positive electrode active material layer) is reduced, and HF corrosion to particles in the positive electrode active material layer on the side farther away from the electrolyte are weakened. In this way, the Mn dissolution is significantly reduced. In some embodiments, if the surface density of the positive electrode active material layer is too large, the surface of the positive electrode active material layer cracks due to poor drying of the positive electrode active material layer. Although this increases the porosity of the positive electrode plate and facilitates the electrolyte infiltration, this deteriorates the Mn dissolution. In addition, if the surface density of the positive electrode active material layer is too small, the tortuosity/porosity of the electrode plate is reduced insignificantly, and the Mn dissolution out of the positive electrode active material layer farther away from the electrolyte cannot be effectively suppressed.

In some embodiments, an Mn dissolution concentration in the positive electrode plate is Z ppm, where $Z=(-52.99X+3215.5)\times10Y/9$, and $160\leq Z\leq 2500$. A relational expression of Mn dissolution concentration (Z/ppm), surface density X (mg/cm$^2$), and mass ratio (Y) of the positive electrode active material lithium manganate is established under the detection index of 28 days storage at 60° C. Based on this relational expression, the development of manganese-containing material systems can be optimized, and the competitiveness of electrochemical apparatuses of manganese-containing material systems can be improved.

In some embodiments, a mass ratio of the manganese-containing material to the positive electrode active material layer ranges from 0.38 to 0.95. Based on a content of the positive electrode active material in the positive electrode active material layer and the mass ratio Y of the manganese-containing material to the positive electrode active material, the mass ratio of the manganese-containing material to the positive electrode active material layer can be obtained.

In some embodiments, the positive electrode plate may further include a positive electrode current collector. In some embodiments, the positive electrode current collector may be an aluminum foil, and certainly may be other positive electrode current collectors commonly used in the art. In some embodiments, the positive electrode active material layer may be disposed on one surface or two surfaces of the positive electrode current collector. In some embodiments, a thickness of the positive electrode current collector may range from 1 μm to 50 μm. In some embodiments, the positive electrode active material layer may be applied only onto part of the positive electrode current collector.

In some embodiments, the positive electrode active material layer may further include another positive electrode active material, conductive agent, and binder. In some embodiments, the conductive agent of the positive electrode plate may include at least one selected from the group consisting of conductive carbon black, laminated graphite, graphene, or carbon nanotube. In some embodiments, the binder in the positive electrode plate may include at least one selected from the group consisting of polyvinylidene fluoride, a vinylidene fluoride-hexafluoropropylene copolymer, styrene-acrylate copolymer, styrene-butadiene copolymer, polyamide, polyacrylonitrile, polyacrylate, polyacrylic acid, polyacrylate, sodium carboxymethylcellulose, polyvinyl acetate, polyvinylpyrrolidone, polyvinyl ether, polymethyl methacrylate, polytetrafluoroethylene, or polyhexafluoropropylene. In some embodiments, the another positive electrode active material includes, but is not limited to, at least one selected from the group consisting of lithium cobaltate, lithium nickelate, lithium manganate, lithium nickel manganate, lithium iron phosphate, lithium nickel cobalt aluminate, or lithium nickel cobalt manganate. In some embodiments, a mass ratio of the positive electrode active material, the conductive agent, and the binder in the positive electrode active material layer is (80-99):(0.1-10):(0.1-10). However, this is merely an example, and any other appropriate mass ratios can be used.

In some embodiments, a negative electrode plate includes a negative electrode current collector and a negative electrode active material layer. In some embodiments, the negative electrode active material layer may be located on one side or two sides of the negative electrode current collector. In some embodiments, the negative electrode active material may further include a negative electrode active material, a conductive agent, and a binder. In some embodiments, the negative electrode active material may include at least one of graphite or a silicon-based material. In some embodiments, the silicon-based material includes at least one selected from the group consisting of silicon, a silicon-oxygen material, a silicon-carbon material, or a silicon-oxygen-carbon material. In some embodiments, the conductive agent in the negative electrode active material layer may include at least one selected from the group consisting of conductive carbon black, Ketjen black, laminated graphite, graphene, carbon nanotube, or carbon fiber. In some embodiments, the binder in the negative electrode active material layer may include at least one selected from the group consisting of carboxymethyl cellulose, polyvinylidene fluoride, polyacrylic acid, polyvinylpyrrolidone, polyaniline, polyimide, polyamideimide, polysiloxane, styrene-butadiene rubber, epoxy resin, polyester resin, polyurethane resin, or polyfluorene. In some embodiments, a mass ratio of the negative electrode active material, the conductive agent, and the binder in the negative electrode active material layer may be (78-98.5):(0.1-10):(0.1-10). It should be understood that the foregoing description is only exemplary. Any other appropriate materials and mass ratios may be used. In some embodiments, the negative electrode current collector may be at least one selected from the group consisting of a copper foil current collector, a nickel foil current collector, or a carbon-based current collector.

In some embodiments, a separator includes at least one selected from the group consisting of polyethylene, polypropylene, polyvinylidene fluoride, polyethylene terephthalate, polyimide, or aramid. For example, polyethylene includes at least one selected from the group consisting of high-density polyethylene, low-density polyethylene, or ultra-high-molecular-weight polyethylene. Especially, polyethylene and polypropylene have a good effect on preventing short circuits and can improve stability of a battery through a shutdown effect. In some embodiments, a thickness of the separator ranges from approximately 3 μm to 20 μm.

In some embodiments, a surface of the separator may further include a porous layer. The porous layer is disposed on at least one surface of the separator. The porous layer includes inorganic particles and the binder. The inorganic particles are selected from at least one selected from the group consisting of aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), cerium dioxide ($CeO_2$), nickel oxide (NiO), zinc oxide (ZnO), calcium oxide (CaO), zirconia oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a pore diameter of the separator ranges from approximately 0.01 μm to 1 μm. The binder in the porous layer is selected from at least one selected from the group consisting of polyvinylidene fluoride, vinylidene fluoride-hexafluoropropylene copolymer, polyamide, polyacrylonitrile, polyacrylic ester, polyacrylic acid, a polyacrylic salt, carboxyl methyl cellulose, polyvinylpyrrolidone, polyvinyl ether, polymethyl methacrylate, polytetrafluoroethylene, or polyhexafluoropropylene. The porous layer on the surface of the separator can improve heat resistance, oxidation resistance, and electrolyte infiltration performance of the separator, and enhance binding between the separator and the electrode plate.

In some embodiments, the electrochemical apparatus includes a lithium-ion battery. However, this application is not limited thereto. In some embodiments, the electrochemical apparatus further includes an electrolyte, where the electrolyte includes at least one selected from the group consisting of fluoroether, fluoroethylene carbonate, or ether nitrile. In some embodiments, the electrolyte further includes a lithium salt. The lithium salt includes lithium bis(fluorosulfonyl)imide and lithium hexafluorophosphate. A concentration of the lithium salt ranges from 1 mol/L to 2 mol/L, and a mass ratio of the lithium bis(fluorosulfonyl) imide to the lithium hexafluorophosphate ranges from 0.06 to 5. In some embodiments, the electrolyte may further include a non-aqueous solvent. The non-aqueous solvent may be a carbonate compound, a carboxylate compound, an ether compound, another organic solvent, or a combination thereof.

The carbonate compound may be a linear carbonate compound, a cyclic carbonate compound, a fluorocarbonate compound, or a combination thereof.

An example of the linear carbonate compound is diethyl carbonate (DEC), dimethyl carbonate (DMC), dipropyl carbonate (DPC), methyl propyl carbonate (MPC), ethyl propyl carbonate (EPC), methyl ethyl carbonate (MEC), and a combination thereof. An example of the cyclic carbonate compound is ethylene carbonate (EC), propylene carbonate (PC), butylene carbonate (BC), vinyl ethylene carbonate (VEC), or a combination thereof. An example of the fluorocarbonate compound is fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, or a combination thereof.

An example of the carboxylate compound is methyl acetate, ethyl acetate, n-propyl acetate, tert-butyl acetate, methyl propionate, ethyl propionate, propyl propionate, γ-butyrolactone, decanolide, valerolactone, mevalonolactone, caprolactone, methyl formate, or a combination thereof.

An example of the ether compound is dibutyl ether, tetraglyme, diglyme, 1,2-dimethoxyethane, 1,2-diethoxyethane, ethoxymethoxy ethane, 2-methyltetrahydrofuran, tetrahydrofuran, or a combination thereof.

An example of the another organic solvent is dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

An embodiment of this application further provides an electronic apparatus including the foregoing electrochemical apparatus. The electronic apparatus in the embodiments of this application is not particularly limited, and may be any known electronic apparatus used in the prior art. In some embodiments, the electronic apparatus may include but is not limited to a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notepad, a calculator, a memory card, a portable recorder, a radio, a standby power source, a motor, an automobile, a motorcycle, a power-assisted bicycle, a bicycle, a drone, a lighting appliance, a toy, a game console, a clock, an electric tool, a flash lamp, a camera, a large household battery, and a lithium-ion capacitor.

Some specific examples and comparative examples are listed below to better illustrate this application. Lithium-ion batteries are used as examples.

Example 1

Preparation of negative electrode plate: A copper foil was used as a current collector, artificial graphite was used as a negative electrode active material, and styrene-butadiene rubber and carboxymethyl cellulose were used as a binder. The negative electrode active material, the styrene-butadiene rubber, acetylene black, and sodium carboxymethyl cellulose were mixed at a mass ratio of 96:1.7:1.0:1.3 and dispersed in deionized water to form a slurry. The slurry was uniformly stirred and then applied onto the copper foil, followed by drying to form the negative electrode active material layer with a thickness of 140 μm, and then followed by cold pressing and slitting to obtain a negative electrode plate.

Preparation of positive electrode plate: A positive electrode active material that was formed by lithium manganate and lithium iron phosphate (a mass ratio of lithium manganate in the positive electrode active material was 40%), conductive carbon black, and a binder polyvinylidene fluoride (PVDF) were uniformly mixed at a mass ratio of 94.8:2.4:2.8 in an N-methylpyrrolidone solvent system and fully stirred. The resulting mixture was applied onto an aluminum foil with a surface density being 18 mg/cm$^2$ to obtain a positive electrode active material layer with a thickness of 200 μm, and then followed by drying and cold pressing to obtain a positive electrode plate.

Preparation of separator: Polyacrylate was stirred to form a uniform slurry, and the slurry was applied onto two surfaces of a porous substrate (polyethylene), followed by drying to form a separator.

Preparation of electrolyte: In an environment with a water content less than 10 ppm, lithium hexafluorophosphate and a non-aqueous organic solvent (a mass ratio of ethylene carbonate (EC):diethyl carbonate (DEC):propylene carbonate (PC):propyl propionate (PP):vinylene carbonate (VC) was 20:30:20:28:2) were mixed at a mass ratio of 8:92 to prepare an electrolyte with a lithium salt concentration of 1 mol/L.

Preparation of lithium-ion battery: The positive electrode plate, the separator, and the negative electrode plate were stacked in sequence, so that the separator was sandwiched between the positive electrode plate and the negative electrode plate for separation, and the stack was wound to obtain an electrode assembly. The electrode assembly was placed in an outer packaging aluminum-plastic film, and was dehydrated at a temperature of 105° C. Then the above-mentioned electrolyte was injected, packaging was performed, and followed by processes such as formation, degassing, and shaping, the lithium-ion battery was obtained.

In other examples and comparative examples, the preparations of the negative electrode plate, the separator, the electrolyte, and the lithium-ion battery were the same as those in Example 1, except that there were some differences in the preparation of the positive electrode plate. Differences in parameters are shown in corresponding tables.

In addition, in this application, the following methods were used to measure corresponding parameters.

Mn Dissolution Test:

(1) Before storage: A non-polarization curve (discharge curve at 0.01 C at 25° C.) was used to find a voltage corresponding to a state of charge (State of Charge, hereinafter referred to as SOC) of the lithium-ion battery being 30%, where the error should not exceed ±5 mV.

(2) During storage: The battery was stored for 28 days at 60° C. at 30% SOC, and capacity recovery was done every 7 days, where steps of the capacity recovery were as follows (it was assumed that a 30% SOC corresponded to 3.24 V):

(1) The temperature was set to be 25° C.; (2) The battery was left standing for 10 minutes; (3) The battery was charged to 4.2 Vat a constant current of 0.2 C, and then charged to 0.05 C at a constant voltage; (4) The battery was left standing for 10 minutes; (5) The battery was discharged to 2.8 V at the constant current of 0.2 C; (6) The battery was left standing for 10 minutes; (7) Steps (2) to (6) were repeated 3 times; (8) The battery was charged to 3.24 V at the constant current of 0.2 C, and then charged to 0.05 C at a constant voltage; and (9) The battery was left standing for 10 minutes.

(3) After storage: The lithium-ion battery was disassembled, 12 circular sheets (with a diameter of 7 mm) were made from the geometric center of the negative electrode plate; an inductive coupled plasma (ICP) device was used to measure values of the Mn dissolution concentrations, and an average value of the values measured was used finally. In view of device differences and interference factors such as the electrolytes, it was stipulated that a value of Mn dissolution concentration measured having an error of being less than or equal to 20% can be deemed to be consistent with a value calculated as per the equation, that is, |the value measured−the value calculated|/the value calculated≤20%.

2. Capacity Recovery Rate Test:

Test Steps for Capacity Before Storage:

(1) The test temperature was 25° C.;

(2) The battery was left standing for 10 minutes;

(3) The battery was charged to 4.2 V at a constant current of 0.2 C, and charged to 0.05 C at a constant voltage;

(4) The battery was left standing for 10 minutes;

(5) The battery was discharged to 2.8 V at a constant current of 0.5 C;

(6) The battery was left standing for 10 minutes;

(7) Steps (3) to (6) were repeated for 3 times, and the capacity at the third time was recorded as initial capacity $A_0$;

(8) The battery was charged to 3.24 V at the constant current of 0.2 C, and charged to 0.05 C at the constant voltage (the state of charge (SOC) of the lithium-ion battery was controlled to be 30%); and (9) The battery was left standing for 10 minutes and the storage was started:

capacity test was done after 28 days of storage at 60° C., where capacity recovery was done every 7 days, and the steps of capacity recovery were as follows:

(1) Test temperature was 25° C.;

8

(2) The battery was left standing for 2 hours;

(3) The battery was discharged to 2.8 V at a constant current of 0.5 C (where a capacity was recorded as residual capacity);

(4) The battery was left standing for 10 minutes;

(5) The battery was charged to 4.2 V at a constant current of 0.2 C, and charged to 0.05 C at the constant voltage;

(6) The battery was left standing for 10 minutes;

(7) The battery was discharged to 2.8 V at the constant current of 0.5 C;

(8) The battery was left standing for 10 minutes;

(9) The battery was charged to 4.2 V at the constant current of 0.2 C, and charged to 0.05 C at the constant voltage;

(10) The battery was left standing for 10 minutes;

(11) Steps (2) to (7) were repeated for 3 times (3 recovery capacities were recorded each time, including the first recovery capacity 1, the second recovery capacity 2, and the third recovery capacity 3), where the third recovery capacity 3 was used as the capacity after storage $A_1$;

(12) The battery was charged to 3.24 V at the constant current of 0.2 C and charged to 0.05 C at the constant voltage (during storage, the voltage was controlled to the specified state of charge (SOC)); and

(13) The battery was left standing for 10 minutes.

The capacity recovery rate was calculated as per: $|A_0−A_1|/A_0×100\%$.

Table 1 shows parameters and evaluation results of Examples 1 to 35 and Comparative Examples 1 to 5. Examples 2 to 35 and Comparative Example 1 to 5 are the same as Example 1 in terms of the preparation method of lithium-ion battery except that the surface densities of the positive electrode active material layer and/or mass ratios of the lithium manganate in the positive electrode active material are different. For detailed differences, refer to Table 1 below.

TABLE 1

| | X (mg/cm$^2$) | Y | Z (ppm) | Capacity recovery rate after storage at 60° C. for 28 days (30% SOC) |
|---|---|---|---|---|
| Example 1 | 18 | 0.4 | 1104 | 71.40% |
| Example 2 | 18 | 0.5 | 1200 | 68.20% |
| Example 3 | 18 | 0.6 | 1400 | 70.20% |
| Example 4 | 18 | 0.7 | 1550 | 70.90% |
| Example 5 | 18 | 0.8 | 1800 | 75.50% |
| Example 6 | 18 | 0.9 | 2022 | 68.80% |
| Example 7 | 18 | 1 | 2500 | 70.24% |
| Example 8 | 28 | 0.4 | 700 | 87.41% |
| Example 9 | 28 | 0.5 | 895 | 86.23% |
| Example 10 | 28 | 0.6 | 1021 | 83.10% |
| Example 11 | 28 | 0.7 | 1400 | 78.20% |
| Example 12 | 28 | 0.8 | 1530 | 76.10% |
| Example 13 | 28 | 0.9 | 1580 | 70.36% |
| Example 14 | 28 | 1 | 2109 | 71.35% |
| Example 15 | 38 | 0.4 | 495 | 71.01% |
| Example 16 | 38 | 0.5 | 680 | 72.14% |
| Example 17 | 38 | 0.6 | 820 | 68.44% |
| Example 18 | 38 | 0.7 | 824 | 69.87% |
| Example 19 | 38 | 0.8 | 1106 | 66.84% |
| Example 20 | 38 | 0.9 | 1021 | 67.11% |
| Example 21 | 38 | 1 | 1384 | 72.14% |
| Example 22 | 48 | 0.4 | 329 | 77.19% |
| Example 23 | 48 | 0.5 | 391 | 75.23% |
| Example 24 | 48 | 0.6 | 452 | 75.19% |
| Example 25 | 48 | 0.7 | 541 | 74.37% |
| Example 26 | 48 | 0.8 | 569 | 73.11% |

TABLE 1-continued

| | X (mg/cm²) | Y | Z (ppm) | Capacity recovery rate after storage at 60° C. for 28 days (30% SOC) |
|---|---|---|---|---|
| Example 27 | 48 | 0.9 | 690 | 72.44% |
| Example 28 | 48 | 1 | 760 | 74.20% |
| Example 29 | 52 | 0.4 | 222 | 83.24% |
| Example 30 | 52 | 0.5 | 280 | 82.10% |
| Example 31 | 52 | 0.6 | 269 | 81.80% |
| Example 32 | 52 | 0.7 | 320 | 78.40% |
| Example 33 | 52 | 0.8 | 400 | 77.80% |
| Example 34 | 52 | 0.9 | 452 | 70.77% |
| Example 35 | 52 | 1 | 530 | 69.02% |
| Comparative Example 1 | 10 | 0.6 | 1200 | 62.01% |
| Comparative Example 2 | 15 | 0.6 | 1100 | 59.24% |
| Comparative Example 3 | 55 | 0.6 | 100 | 70.31% |
| Comparative Example 4 | 15 | 0.2 | 800 | 72.18% |
| Comparative Example 5 | 10 | 0.2 | 900 | 70.24% |

It can be learned from comparison between Examples 1 to 7 that under the condition that the positive electrode active material layers have the same surface densities, as the mass ratio (Y) of lithium manganate to the positive electrode active material increases, the Mn dissolution is positively correlated with the mass ratio and generally exhibits an upward trend. This is mainly because of the increase of the contact area between the lithium manganate particles and the electrolyte and the Jahn-Teller (J-T) effect, leading to a significant increase in the Mn dissolution concentration. The same conclusion can be reached by comparison of Examples 8 to 12, or by comparison of Examples 16 to 21, or by comparison of Examples 23 to 28, or by comparison of Examples 30 to 35.

By comparison of Examples 1, 8, 16, 23, and 30, it can be learned that under the condition that the ratio of lithium manganate is given, the Mn dissolution concentration is reduced significantly as the surface density increases, migration capability of the electrolyte in the thickness direction of the positive electrode plate decreases at high surface density of the positive electrode active material layer, and the positive electrode active material particles close to the positive electrode current collector are less corrosion by HF, and therefore the Mn dissolution concentration is significantly reduced. The same conclusion can be reached by comparison of Examples 7, 15, 22, and 29.

By comparison of Comparative Examples 4 and 5, it can be learned that Mn dissolution significantly decreases at low surface density and low ratio of lithium manganate material. This conforms to the basic principle of Mn dissolution decrease. However, at the dual effect of the low surface density and low ratio of lithium manganate material, although the Mn dissolution concentration is significantly decreased beyond the predicted range of the relational expression, the low-cost advantage is also lost. This is not conducive to industrialized production at reduced costs. In addition, the capacity loss (or capacity recovery rate) of the lithium-ion battery is positively correlated with the Mn dissolution concentration. For example, referring to Examples 8 to 12, the surface densities are 28 mg/cm², and as the Mn dissolution concentration increases, the storage capacity recovery rate gradually decreases. At this time, the mechanism of capacity loss is that the Mn dissolution damages a solid electrolyte interface film (SEI film) at the negative electrode, leading to capacity loss. However, a less degree of consistency in other examples indicates that the storage capacity loss and the Mn dissolution are not in a one-to-one correspondence, and the capacity loss may also be caused by negative side reactions and other causes.

The foregoing descriptions are only preferred examples of this application and explanations of the technical principles used. Persons skilled in the art should understand that the related scope disclosure in this application is not limited to the technical solutions formed by a specific combination of the foregoing technical characteristics, and should also cover other technical solutions formed by any combination of the foregoing technical features or their equivalent features. For example, the technical solution formed by replacement between the foregoing features and technical features having similar functions disclosed in this application.

What is claimed is:

1. An electrochemical apparatus, comprising:
a positive electrode plate, wherein the positive electrode plate comprises a positive electrode active material layer, the positive electrode active material layer comprises a positive electrode active material, the positive electrode active material comprises a manganese-containing material, and a mass ratio Y of the manganese-containing material to the positive electrode active material ranges from 0.4 to 1;
wherein a surface density of the positive electrode active material layer is X mg/cm², wherein $18 \leq X \leq 52$; and
wherein an Mn dissolution concentration in the positive electrode plate is Z ppm, wherein $Z=(-52.99X+3215.5)\times 10Y/9$, and $204 \leq Z \leq 2500$.

2. The electrochemical apparatus according to claim 1, wherein the manganese-containing material contains lithium manganate.

3. The electrochemical apparatus according to claim 2, wherein the lithium manganate contains cubic-crystal-system lithium manganate.

4. The electrochemical apparatus according to claim 1, wherein a mass ratio of the manganese-containing material to the positive electrode active material layer ranges from 0.38 to 0.95.

5. The electrochemical apparatus according to claim 1, wherein the positive electrode plate further comprises a positive electrode current collector, and the positive electrode active material layer is disposed on one surface or two surfaces of the positive electrode current collector.

6. The electrochemical apparatus according to claim 1, wherein the positive electrode active material layer further comprises a conductive agent and a binder.

7. The electrochemical apparatus according to claim 6, wherein the conductive agent comprises at least one selected from the group consisting of conductive carbon black, Ketjen black, laminated graphite, graphene, carbon nanotube, and carbon fiber; the binder comprises at least one selected from the group consisting of carboxymethyl cellulose, polyvinylidene fluoride, polyacrylic acid, polyvinylpyrrolidone, polyaniline, polyimide, polyamideimide, polysiloxane, styrene-butadiene rubber, epoxy resin, polyester resin, polyurethane resin, and polyfluorene; and a mass ratio of the positive electrode active material, the conductive agent, and the binder in the positive electrode active material layer is (80-99):(0.1-10):(0.1-10).

8. The electrochemical apparatus according to claim 1, wherein the mass ratio Y of the manganese-containing material to the positive electrode active material ranges from 0.4 to 0.7.

9. An electronic apparatus comprises an electrochemical apparatus, the electrochemical apparatus comprising:

a positive electrode plate, wherein the positive electrode plate comprises a positive electrode active material layer, the positive electrode active material layer comprises a positive electrode active material, the positive electrode active material comprises a manganese-containing material, and a mass ratio Y of the manganese-containing material to the positive electrode active material ranges from 0.4 to 1;

wherein a surface density of the positive electrode active material layer is X mg/cm², wherein $18 \leq X \leq 52$; and wherein an Mn dissolution concentration in the positive electrode plate is Z ppm, wherein $Z = (-52.99X + 3215.5) \times 10Y/9$, and $204 \leq Z \leq 2500$.

10. The electronic apparatus according to claim 9, wherein the manganese-containing material contains lithium manganate.

11. The electronic apparatus according to claim 10, wherein the lithium manganate contains cubic-crystal-system lithium manganate.

12. The electronic apparatus according to claim 9, wherein a mass ratio of the manganese-containing material to the positive electrode active material layer ranges from 0.38 to 0.95.

13. The electronic apparatus according to claim 9, wherein the positive electrode plate further comprises a positive electrode current collector, and the positive electrode active material layer is disposed on one surface or two surfaces of the positive electrode current collector.

14. The electronic apparatus according to claim 9, wherein the positive electrode active material layer further comprises a conductive agent and a binder.

15. The electronic apparatus according to claim 14, wherein the conductive agent comprises at least one selected from the group consisting of conductive carbon black, Ketjen black, laminated graphite, graphene, carbon nanotube, and carbon fiber; the binder comprises at least one selected from the group consisting of carboxymethyl cellulose, polyvinylidene fluoride, polyacrylic acid, polyvinylpyrrolidone, polyaniline, polyimide, polyamideimide, polysiloxane, styrene-butadiene rubber, epoxy resin, polyester resin, polyurethane resin, and polyfluorene; and a mass ratio of the positive electrode active material, the conductive agent, and the binder in the positive electrode active material layer is (80-99):(0.1-10):(0.1-10).

* * * * *